(12) United States Patent
Archer et al.

(10) Patent No.: US 9,231,697 B2
(45) Date of Patent: Jan. 5, 2016

(54) TRANSMISSION PROTOCOL CONTROLLER

(71) Applicants: Christopher A. Archer, Fort Wayne, IN (US); James M. Cicchiello, Fort Wayne, IN (US); John Featherston, Fort Wayne, IN (US); Frederick D. Bean, Fort Wayne, IN (US)

(72) Inventors: Christopher A. Archer, Fort Wayne, IN (US); James M. Cicchiello, Fort Wayne, IN (US); John Featherston, Fort Wayne, IN (US); Frederick D. Bean, Fort Wayne, IN (US)

(73) Assignee: Northrop Grumman Systems Corporation, Falls Church, VA (US)

(*) Notice: Subject to any disclaimer, the term of this patent is extended or adjusted under 35 U.S.C. 154(b) by 85 days.

(21) Appl. No.: 14/132,868

(22) Filed: Dec. 18, 2013

(65) Prior Publication Data

US 2015/0171962 A1 Jun. 18, 2015

(51) Int. Cl.
*H04J 3/00* (2006.01)
*H04B 10/11* (2013.01)
*H04B 10/40* (2013.01)

(52) U.S. Cl.
CPC ............... *H04B 10/11* (2013.01); *H04B 10/40* (2013.01)

(58) Field of Classification Search
None
See application file for complete search history.

(56) References Cited

U.S. PATENT DOCUMENTS

| 4,402,090 A | 8/1983 | Gfeller et al. |
| 5,818,619 A | 10/1998 | Medved et al. |
| 8,526,403 B1 * | 9/2013 | Nadji et al. .................... 370/338 |
| 2004/0218532 A1 * | 11/2004 | Khirman ....................... 370/235 |
| 2005/0238357 A1 | 10/2005 | Farrell |
| 2005/0254430 A1 * | 11/2005 | Clark et al. .................... 370/241 |
| 2008/0043750 A1 * | 2/2008 | Keels et al. ................ 370/395.52 |
| 2008/0144663 A1 * | 6/2008 | Johnson et al. ................ 370/469 |
| 2009/0097414 A1 * | 4/2009 | Yoon et al. ..................... 370/254 |

FOREIGN PATENT DOCUMENTS

WO   WO 91/09477   6/1991

OTHER PUBLICATIONS

Baldantoni, et al: "*Adaptive End-to-End FEC for Improving TCP Performance Over Wireless Links*"; IEEE Communications Society, IEEE 2004, pp. 4023-4027.
Klein, et al.: "*Avoiding Spurious TCP Timeouts in Wireless Networks by Delay Injection*"; Global Telecommunications Conference, 2004 GLOBECOM '04, IEEE vol. 5 Digital Object Indentifier: 10.1109/GLOCOM.2004.1378856 Publication Year: 2004 , pp. 2754-2759 vol. 5.
Sonnenberg, et al.; "*Routing Impact in Highly Dynamic Mesh Networks of RF and FSO Links*"; Military Communications Conference, 2009. MILCOM 2009. IEEE Digital Object Indentifier: 10.1109/MILCOM.2009.5379765 Publication Year: 2009 , pp. 1-7.
Braden, Robert. "T/TCP—TCP extensions for transactions functional specification." (1994).

(Continued)

*Primary Examiner* — Omar Ghowrwal
*Assistant Examiner* — Angel Brockman
(74) *Attorney, Agent, or Firm* — Tarolli, Sundheim, Covell & Tummino LLP (57) ABSTRACT

A free-space optical (FSO) transceiver can include a transmission protocol configured to encapsulate outgoing network packets in by employing a reliable ordered protocol that relies on retransmission of lost data to form outgoing encapsulated packets. The transmission protocol controller can be configured to employ a congestion algorithm that optimizes throughput over a lossy link. The FSO transceiver can also include a transmitter configured to provide an output optical signal corresponding to the outgoing encapsulated packets over an FSO link.

17 Claims, 4 Drawing Sheets

(56) References Cited

OTHER PUBLICATIONS

Chen, Sheng. "An overview on the Integrated IP Optical data control plane in the Optical Transport Network." *Communications, Circuits and Systems Proceedings, 2006 International Conference on.* vol. 3. IEEE, 2006.

Kassem, Ghulam, et al. "TCP variants: An overview." *Computational Intelligence, Modelling and Simulation (CIMSIM), 2010 Second International Conference on.* IEEE, 2010.

Kliazovich, Dzmitry, Fabrizio Granelli, and Daniele Miorandi. "TCP Westwood+ enhancement in high-speed long-distance networks." *Communications, 2006. ICC'06. IEEE International Conference on.* vol. 2. IEEE, 2006.

Le, Tuong, et al. "Reliable user datagram protocol for airborne network." *Military Communications Conference, 2009. MILCOM 2009, IEEE.* IEEE; 2009.

Radhakrishnan, Sivasankar. *Network Performance improvements for Web Services—An End-to-End View.* Diss. University of California, San Diego, 2014.

\* cited by examiner

TRANSMISSION PROTOCOL CONTROLLER

TECHNICAL FIELD

This disclosure relates to a transmission protocol controller that employs a reliable ordered delivery protocol that relies on retransmission of lost data. More particularly, this disclosure relates to a transmission protocol controller that encapsulates network packets.

BACKGROUND

Free-space optical communication (FSO) is an optical communication technology that employs light propagating in free space to transmit data for telecommunications and/or computer networking. "Free space" can mean air, outer space, water, etc. FSO contrasts with using a solid medium such as optical fiber cable or an optical transmission line. FSO can be useful where physical connections are impractical due to high costs and/or other considerations.

SUMMARY

In one example, a free-space optical (FSO) transceiver can include a transmission protocol controller configured to encapsulate outgoing network packets by employing a reliable ordered delivery protocol that relies on retransmission of lost data form outgoing encapsulated packets. The transmission protocol controller can be configured to employ a congestion algorithm that optimizes throughput over a lossy link. The FSO transceiver can also include a transmitter configured to provide an output optical signal corresponding to the outgoing encapsulated packets over a FSO link.

In another example, a system can include a first FSO transceiver configured to receive Ethernet frames from a first subnet of a local area network (LAN). The first FSO transceiver can also be configured to encapsulate the Ethernet frames in encapsulated packets by employing a reliable ordered delivery protocol that relies on retransmission of lost data with a congestion algorithm that optimizes throughput over a lossy link and to provide an output optical signal over free space, the output optical signal corresponding to the encapsulated packets. The system can also include a second FSO transceiver separated by free space from the FSO transceiver. The second FSO transceiver can be configured to receive the output optical signal from the first FSO transceiver. The second FSO transceiver can also be configured to unencapsulate the encapsulated packets to reconstruct the Ethernet frames and provide the Ethernet frames to a second subnet of the LAN.

In yet another example, a method can include receiving, by a network port, network packets. The method can also include encapsulating, by a transmission protocol controller, the network packets to form TCP-encapsulated packets. The TCP-encapsulated packets can be formed with a congestion algorithm that optimizes throughput over a lossy link. The method can further include transmitting, by a transmitter, an output optical signal over free space that is based on the TCP-encapsulated packets.

DETAILED DESCRIPTION

This disclosure relates to a system that can establish a bi-directional communication path over a free space optical (FSO) link. The FSO link can directly communicatively couple a first FOS transceiver to a second FSO transceiver. Each of the first and second FSO transceivers can be coupled to networks that can provide network packets for transmission over the FSO link. Each of the first and second FSO transceivers can include a transmission protocol controller that can be configured to encapsulate network packets with a reliable ordered protocol that relies on retransmission of lost data to form encapsulated packets that can be transmitted over the FSO link. Moreover, each transmission protocol controller can employ a congestion algorithm (e.g., an alternate congestion-control algorithm) that optimizes throughput over a lossy link, such as the FSO link. Further, each FSO transceiver can include a buffer to add latency to each network packet that has been unencapsulated to ensure smoothing of throughput over time, particularly in times of a network fade.

Figure 1:
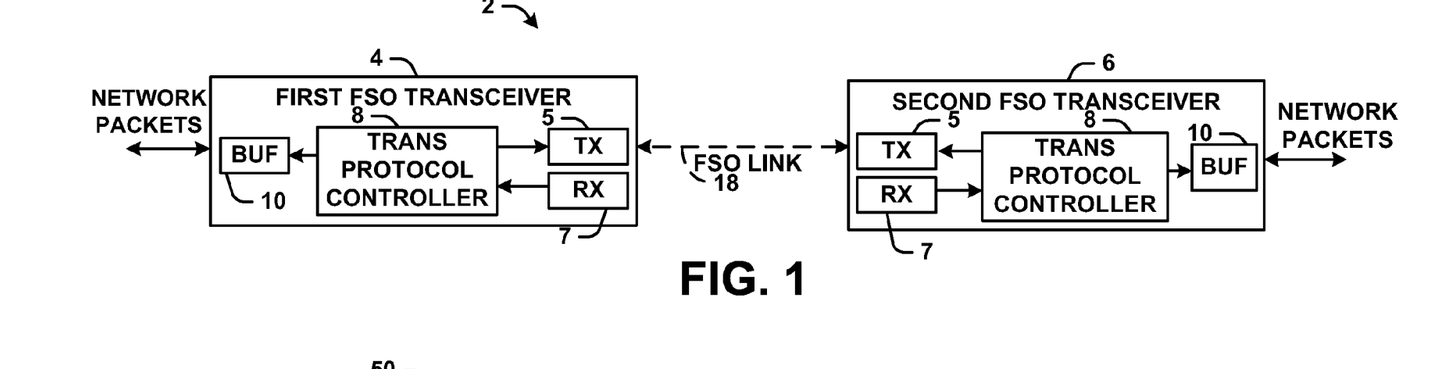
FIG. 1 illustrates an example of a system for establishing a transmission control protocol (TCP) bridge over a free space optical (FSO) link.

FIG. 1 illustrates an example of a system 2 with a first FSO transceiver 4 and a second FSO transceiver 6. Each of the first and second FSO transceivers 4 and 6 can provide and receive optical signals. Each of the first and second FSO transceivers 4 and 6 can include a transmitter 5 (e.g., a laser) and a receiver 7 (e.g., a photodetector, such as a photodiode). The first and second FSO transceivers 4 and 6 can optically communicate over free space, such as air, a water, etc. Thus, the first and second FSO transceivers 4 and 6 can be separated by between about several meters to distances of 10's of kilometers or more. Moreover, the first and second FSO transceivers 4 and 6 can have a direct line of sight.

The first FSO transceiver 4 and the second FSO transceiver 6 can each receive network packets, such as outgoing network packets from a local area network (LAN). The outgoing network packets can be, for example, Ethernet frames (e.g., a series of Ethernet frames) that are destined for nodes of the LAN across the FSO link. Components of the first FSO transceiver 4 and the second FSO transceiver 6 can be implemented as hardware (e.g., a microcontroller, a field programmable gate array, an application specific integrated circuit chip, etc.), software (e.g., instructions executing on a processor) or a combination thereof. Moreover, the first FSO transceiver 4 can include a transmission protocol controller 8 that can be configured to encapsulate the outgoing network packets by employing a reliable ordered delivery protocol that relies on retransmission of lost data. The reliable ordered delivery protocol could be, for example, the Transmission Control Protocol (TCP), the Reliable User Datagram Protocol, TCP Fast Open (TFO), Transactional Transmission Control Protocol (T/TCP), or another protocol that operates in a manner similar to TCP, such as a proprietary protocol. For purposes of simplification of explanation, throughout this disclosure examples are given that employ TCP. However, in other examples, any of the aforementioned protocols that are a reliable ordered protocol that rely on the retransmission of data could be employed. Accordingly, in one example, the transmission protocol controller can be configured to encapsulate network packets into a series of TCP packets to form outgoing TCP-encapsulated packets. The transmission protocol controller 8 can employ an alternate congestion algorithm that is different from the standard congestion algorithm (e.g., TCP Reno or TCP Tahoe). The alternate congestion algorithm can be designed/programmed to optimize throughput over a lossy link (e.g., free space). In some examples, the first FSO transceiver 104 can be mounted on a first structure (e.g., a building, a satellite, a tower, etc.) and the second FSO transceiver 106 can be mounted on a second structure (e.g., another building, another satellite, another tower, etc.), where the first FSO transceiver 104 and the second FSO transceiver 106 have direct line-of-sight.

The transmission protocol controller 8 can provide the outgoing TCP-encapsulated packets to the transmitter 5 of the first FSO transceiver 4. The transmitter 5 can be configured to modulate the TCP-encapsulated packets onto an output optical signal that can be transmitted to a receiver 7 of the second FSO transceiver 6. In some examples, the first FSO transceiver 4 can convert the outgoing TCP-encapsulated packets into a corresponding output optical signal via intensity modulation.

Additionally, the first FSO transceiver 4 can include a receiver 7 that can receive an input optical signal with incoming TCP-encapsulated packets modulated thereon from the second FSO transceiver 6. The receiver 7 can demodulate the incoming TCP-encapsulated packets and provide the incoming TCP-encapsulated packets to the transmission protocol controller 8 of the first FSO transceiver 4. The transmission protocol controller 8 can unencapsulate the incoming TCP-encapsulated packets to generate incoming network packets. Additionally, the first FSO transceiver 4 can include a buffer 10 that can add a relatively small amount of latency (e.g., up to about 10 milliseconds) to each of the incoming network packets to ensure smoothing of output. The incoming network packets can be provided to the LAN.

The second FSO transceiver 6 can also include a transmission protocol controller 8 and a buffer 10. Moreover, the second FSO transceiver 6 can operate in a manner substantially similar to the first FSO transceiver 4. In this manner, the first and second FSO transceivers 4 and 6 can establish bi-directional communication to provide an FSO link 16.

Since both the first and second FSO transceivers 4 and 6 transmit and receive modulated TCP-encapsulated packets, the FSO link 18 can be a TCP bridge. Moreover, the free space between the first FSO transceiver 4 and the second FSO transceiver 6 can be a lossy link (e.g., a lossy medium). The quality of the lossy link can vary based on atmospheric scintillation which can change based on a number of factors, including thermal gradients, wind turbulence, cloud coverage, etc. The atmospheric scintillation can reflect seeing conditions for the transmitter 5 of the first and second FSO transceivers 4 and 6. During a time of a relatively high atmospheric scintillation, a signal-to-noise ratio for an optical signal propagated between the first FSO transceiver 4 and the second FSO transceiver 6 can drop below a tolerable limit, which can cause a network fade. During a network fade, the bandwidth of the TCP bridge can be significantly reduced. The network fade can last, for example between about 1 and about 20 milliseconds.

As noted, the transmission protocol controller 8 can employ an alternate congestion algorithm. By employment of a conventional congestion algorithm, such as TCP Reno, detection of a network fade can be interpreted as network congestion on a multi-node (e.g., 10 or more nodes) network. In the present situation, since there are only two nodes (the first FSO transceiver 4 and the second FSO transceiver) no such congestion would not exist and the employing the same congestion strategy as a multi-node network would result in a loss of bandwidth.

The alternate congestion algorithm implemented by the transmission protocol controller 8 can be an algorithm that can adapt to detection of a network fade. The alternate congestion algorithm could be, for example, the TCP Westwood+ congestion algorithm. The TCP Westood+ is a sender-side only modification of the TCP Reno protocol stack that optimizes the performance of TCP congestion control over wireless networks. TCP Westwood+ is based on an end-to-end bandwidth estimation to set a congestion window and a slow start threshold after a congestion episode, that is, after three duplicate acknowledgments or a timeout. The bandwidth can be estimated by low-pass filtering a rate of returning acknowledgment packets. The rationale of the congestion strategy in TCP Westwood+ is simple: in contrast with TCP Reno, which blindly halves the congestion window after three duplicate acknowledgements (ACKs), TCP Westwood+ adaptively sets a slow start threshold and a congestion window which takes into account the bandwidth employed at the time congestion is experienced. TCP Westwood+ significantly increases throughput over wireless links compared to TCP Reno/New Reno in wired networks. In other examples, the alternate congestion algorithm could be another congestion algorithm optimized for a direct lossy link that does not simply reduce bandwidth in response to detection of congestion (e.g., as does TCP Reno).

Figure 2:
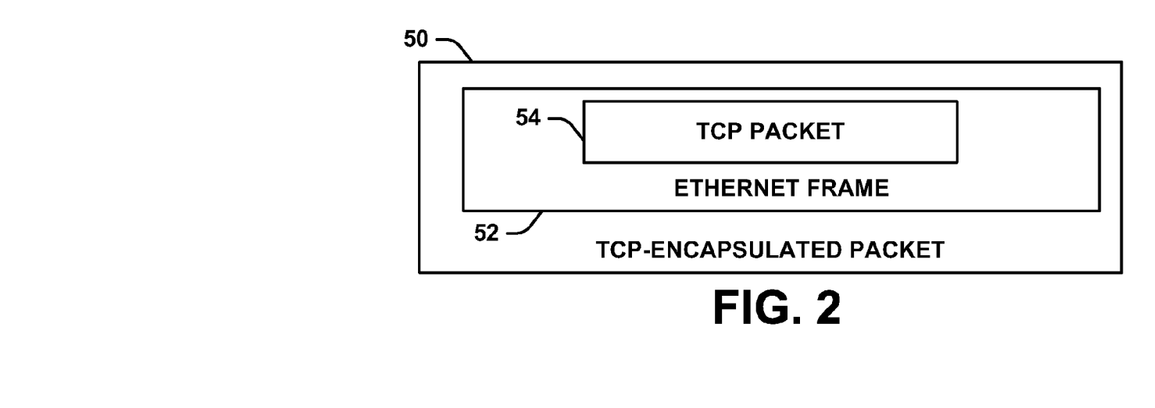
FIG. 2 illustrates an example of a TCP-encapsulated packet.

Furthermore, as noted, the incoming and outgoing network packets processed at the first FSO transceiver 4 and the second FSO transceiver 6 can be Ethernet frames. The Ethernet frames can encapsulate nearly any type of packet, including, but not limited to any packet from the Internet protocol suite (TCP/IP). Moreover, in many situations, the Ethernet frames can encapsulate a TCP packet, such as situations where two nodes separated by the free space communicate via TCP. Thus, the TCP-encapsulated packets can include a TCP packet (or more than one TCP packet) encapsulated in the Ethernet packet. FIG. 2 illustrates an example on this arrangement. In FIG. 2, the TCP-encapsulated packet 50 (which can be referred to as an inner TCP packet) contains an encapsulated Ethernet frame 52, which in turn encapsulates a different TCP packet 54 (which can be referred to an outer TCP packet).

Referring back to FIG. 1, Outer TCP packets (transmitted over an outer TCP loop between network nodes connected to the first FSO transceiver 4 and the second FSO transceiver 6) can be separated from the inner TCP packets (transmitted over an inner TCP loop defined by the first FSO transceiver 4 and the second FSO transceiver 6) in the frequency domain response by a latency introduced in a buffering of data in the inner loop. Such a latency can be added at a receiving side of the FSO link 18 (e.g., in the inner loop) by the buffer 10 to provide throughput smoothing. The inclusion of such latency can facilitate avoidance and/or reduction of a transmission storm that could be caused by the outer TCP packets being retransmitted over the outer loop, wherein such outer TCP packets are also being transmitted within the inner loop.

By employing the system 2, the free space optical link between the first FSO transceiver 4 and the second FSO transceiver 6 can operate reliably with conditions up to about 10% raw data loss in the free space optical link. Moreover, under saturated atmospheric scintillation conditions the gap between the sensitivity needed to maintain the free space optical link between the first FSO transceiver 4 and the second FSO transceiver 6 with fade tolerant networking and the absolute sensitivity needed to transmit equally as well through the network fades can be several decibels.

Figure 3:
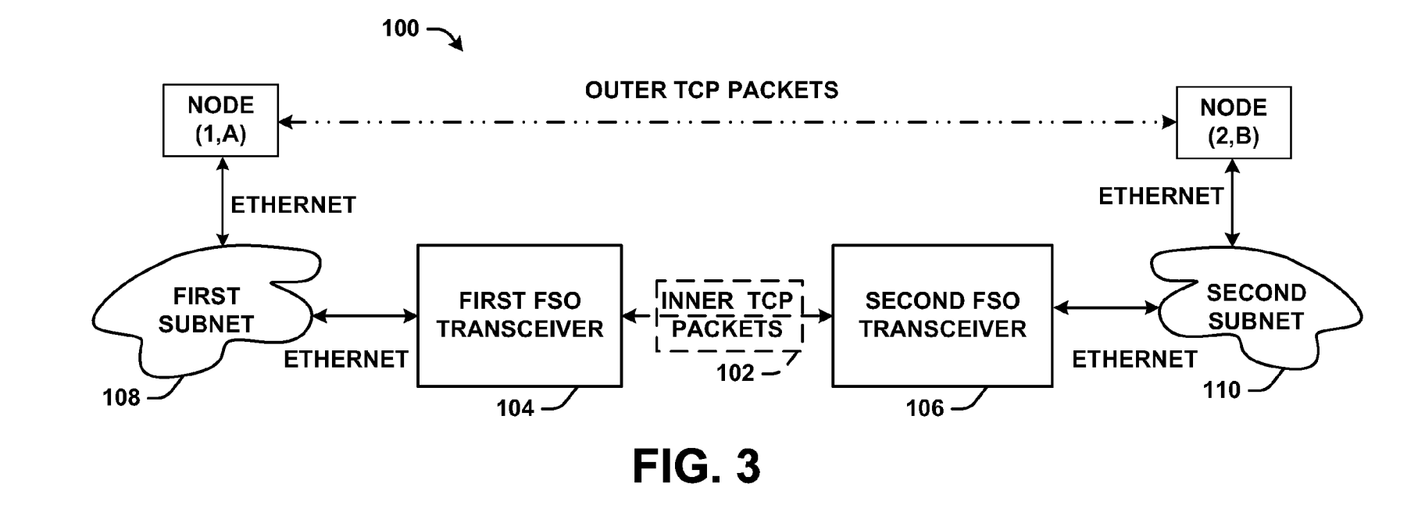
FIG. 3 illustrates another example of a system for establishing a TCP bridge over an FSO link.

FIG. 3 illustrates an example of a system 100 with a FSO link 102 that couples a first FSO transceiver 104 with a second FSO transceiver 106 that could be employed to implement the system 2 of FIG. 1. The first and second FSO transceivers 104 and 106 could be implemented, for example, in a manner similar to the first or second FSO transceivers 4 and 6 of FIG. 1.

The first FSO transceiver 104 can communicate with a first subnet 108 of a network and the second FSO transceiver 106 can communicate with a second subnet 110 of the network that are separated by free space (e.g., from about several meters to about 40 kilometers or more). The FSO link 102 can provide a data bridge between the first subnet 108 and the second subnet 110 of the network. In this manner, any node on the first subnet 108 of the network can communicate with any node on the second subnet 110 of the network (and vice versa) via the FSO link 102. Each of the first and second subnets 108 and 110 of the network can be LANs, such as Ethernet networks.

Figure 4:
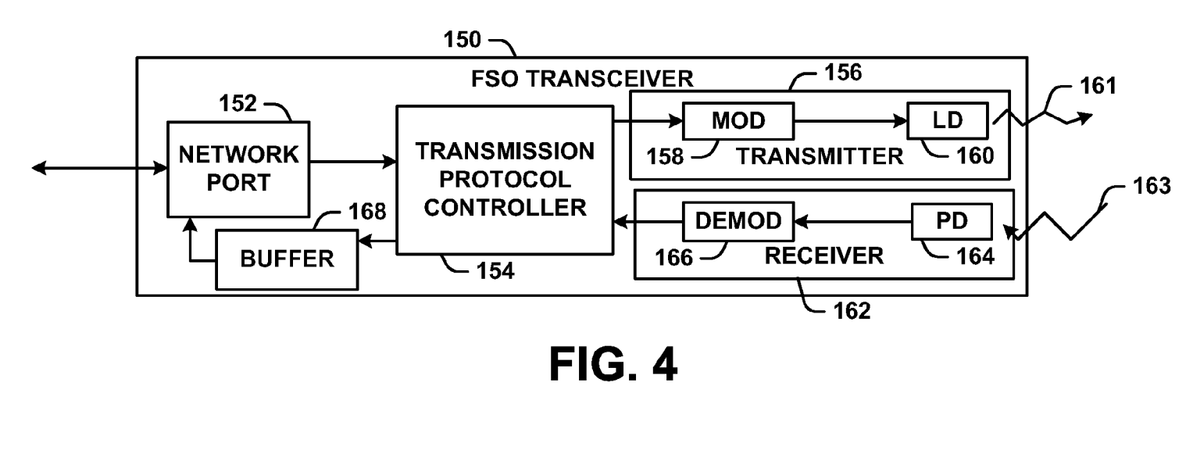
FIG. 4 illustrates an example of an FSO transceiver.

Each of the first and second FSO transceivers 104 and 106 can be implemented as an FSO transceiver 150 illustrated in FIG. 4. For purposes of simplification of explanation, the components of the FSO transceiver 150 are illustrated and described as being implemented on a single unit. However, in other examples, the components of the FSO transceiver 150 can span multiple interconnected units. Moreover, the components of the FSO transceiver 150 can be implemented as hardware (e.g., a microcontroller, a field programmable gate array, an application specific integrated circuit chip, etc.), software (e.g., instructions executing on a processor) or a combination thereof. The FSO transceiver 150 can include a network port 152, such as an Ethernet port. The network port 152 can be coupled to a LAN. For example, the network port 152 can be coupled to a network router or a network switch. In this manner, the FSO transceiver 150 can achieve bi-directional communication with the LAN.

The network port 152 can communicate with a transmission protocol controller 154. The transmission protocol controller 154 can be configured to encapsulate and unencapsulate network packets (such as Ethernet frames communicated to and from the network port 152) in TCP packets.

In a first example (hereinafter, "the first example"), the network port 152 can provide the transmission protocol controller 154 with Ethernet frames destined for a node separated by free space. The transmission protocol controller 154 can form the TCP-encapsulated packets by employing an alternate congestion algorithm, such as the TCP Westwood+ algorithm. The alternate congestion algorithm can be designed to optimize throughput over a lossy link, such as free space.

In the first example, the TCP-encapsulated packets can be provided to a transmitter 156 than can include a modulator 158, which modulator 158 can modulate (e.g., encode) the TCP-encapsulated packets onto a carrier frequency to form modulated TCP-encapsulated packets. In the first example, the modulator 158 can provide the modulated TCP-encapsulated packets to a laser diode 160 (or other optical output device) of the transmitter 156 that can be configured to convert the modulated TCP-encapsulated packets into an output optical signal 161 that can be received by another FSO transceiver 150. In some examples, the output optical signal conforms to an optical encoding protocol for a lossless fiber, such as the 1000 base EX.

In a second example, (hereinafter, "the second example"), a receiver 162 can receive an input optical signal 163 at a photodetector 164 (e.g., a photodiode) that can be provided from the other FSO transceiver 150. The photodetector 164 of the receiver 162 can convert the input optical signal into an electrical signal that includes modulated TCP-encapsulated packets. The photodetector 164 can provide the modulated TCP-encapsulated packets to a demodulator 166 of the receiver 162. The demodulator 166 can demodulate the modulated TCP-encapsulated packet to form TCP-encapsulated packets and provide the TCP-encapsulated packets to the transmission protocol controller 154.

In the second example, the transmission protocol controller 154 can be configured to unencapsulate the TCP-encapsulated packets to form Ethernet frames. The FSO transceiver 150 can include a buffer 168 that can ensure a smoothing of throughput. The Ethernet frames can be provided to the network port 152, where the Ethernet frames can be output onto the LAN.

Referring back to FIG. 3, a node on the first subnet 108 of a network, namely node (1,A) can establish a bi-directional communication link with a node on the second subnet 110 of the network, namely node (2,B). In this example, for purposes of simplification of explanation, the address of each node can be a unique two-dimensional identifier that can identify a subnet of the network (e.g., '1' or '2') as well as a node number on the corresponding subnet (e.g., 'A' or 'B'). In other examples, each node address can be implemented in a similar manner (e.g., an IP address) or a different manner.

Each communicating node, namely the node (1,A) and the node (2,B) can be implemented as a network device, such as an end-user computer (e.g., a desktop computer, a smart phone, a tablet computer, etc.), a server, a router or any other network device that can be an end-point for the network.

In the present example, it is presumed that the bi-directional communication link includes TCP packets transmitted from node (1,A) to node (2,B) and vice versa. It is noted that while FIG. 3 illustrates a direction connection between node (1,A) to node (2,B), it is to be understood that the data flows across the FSO link 102. Such TCP packets can be referred to as outer TCP packets (e.g., forming an outer TCP loop between nodes (1,A) and (2,B)). The outer TCP packets can be, for example, TCP packets that are encapsulated in Ethernet frames.

TCP packets transmitted from node (1,A) to node (2,B) can be encapsulated in an Ethernet frame and transmitted to the first FSO transceiver 104 via the first subnet 108 of the network. In response, the first FSO transceiver 104 can encapsulate the Ethernet frames in TCP packets to form TCP-encapsulated packets. The first FSO transceiver 104 can employ, for example an alternative congestion algorithm, such as the TCP Westwood+ congestion algorithm to form the TCP-encapsulated packets. The TCP-encapsulated packets can be modulated onto an output optical signal and transmitted to the second FSO transceiver 106 to establish the FSO link. Moreover, since the packets transmitted via the FSO link include the TCP-encapsulated packets (modulated onto the optical signal), the TCP-encapsulated packets can be referred to as inner TCP packets (e.g., establishing an inner TCP loop between the first FSO transceiver 104 and the second FSO transceiver 106). The inner TCP packets can be implemented, for example, in a manner similar to the TCP-encapsulated packet 50 illustrated in FIG. 2.

The second FSO transceiver 106 can receive an input modulated signal that corresponds to the output modulated signal. The second FSO transceiver 106 can demodulate the input optical signal to reconstruct the TCP-encapsulated packets. The second FSO transceiver 106 can unencapsulate the TCP-encapsulated packets to reconstruct the corresponding Ethernet frames.

Outer TCP packets transmitted over the outer TCP loop can be separated from the inner TCP packets transmitted over an inner TCP loop in the frequency domain response by a latency introduced in a buffering of data in the inner loop. Such a latency (e.g., about 1 to about 10 ms) can be added at the second FSO transceiver 106 to provide throughput smoothing. The inclusion of such latency can facilitate avoidance and/or reduction of a transmission storm that could be caused by the outer TCP packets being retransmitted over the outer loop, wherein such outer TCP packets are also being transmitted within the inner loop. The Ethernet frames can be provided to the node (2,B) via the second subnet 110 of the network. In response, the node (2,B) can provide TCP packets destined for the node (1,A) in a substantially similar manner. Further, although the nodes (1,A) and (2,B) are illustrated and described as communicating via TCP packets, in other examples, the nodes (1,A) and (2,B) can communicate with other protocols, including but not limited to any protocol on the Internet protocol suite (e.g., TCP/IP).

By employing the present system, network fades that occur due to atmospheric scintillation occurring in the free space between the first and second FSO transceivers 104 and 106 can be managed such that throughput can be optimized. In particular, employment of the alternate congestion algorithm (e.g., the TCP Westwood+ algorithm) by the first and second FSO transceivers 104 and 106 ensures that throughput changes occurring due to the atmospheric scintillation do not result in an excessive loss of bandwidth and/or packet loss.

Further, by implementing a buffer (e.g., the buffer 168 of FIG. 4) in the first and second FSO transceivers 104 and 106, the timing of the TCP-encapsulated packets (e.g., the inner TCP packets) and the outer TCP packets is different. Moreover, in many instances, the maximum throughput over the FSO link (e.g., 1000 megabits per second) will be greater than the maximum throughput between node (1,A) and the first subnet 108 of the network as well as the throughput between node (2,B) and the second subnet 110 of the network (e.g., 100 megabits per second). Both of these factors (the different timing and the different throughputs) reduces and/or eliminates the chances of a TCP storming occurring.

Figure 5:
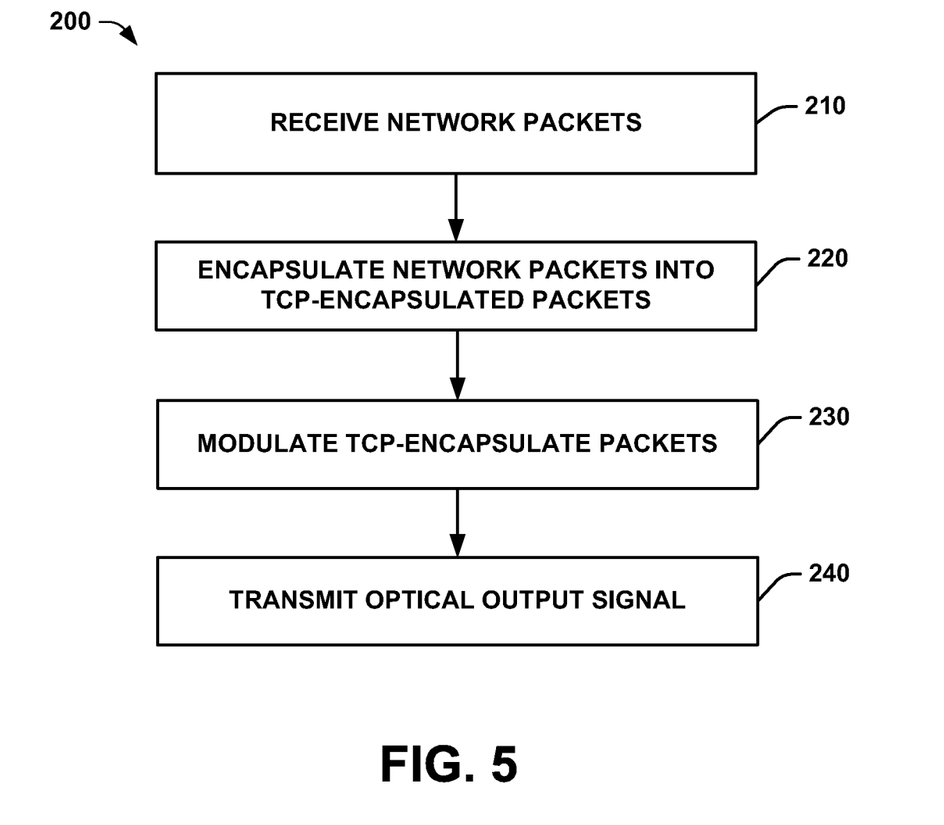
FIG. 5 illustrates an example of a flowchart of an example method for operating an FSO transceiver.
Figure 6:
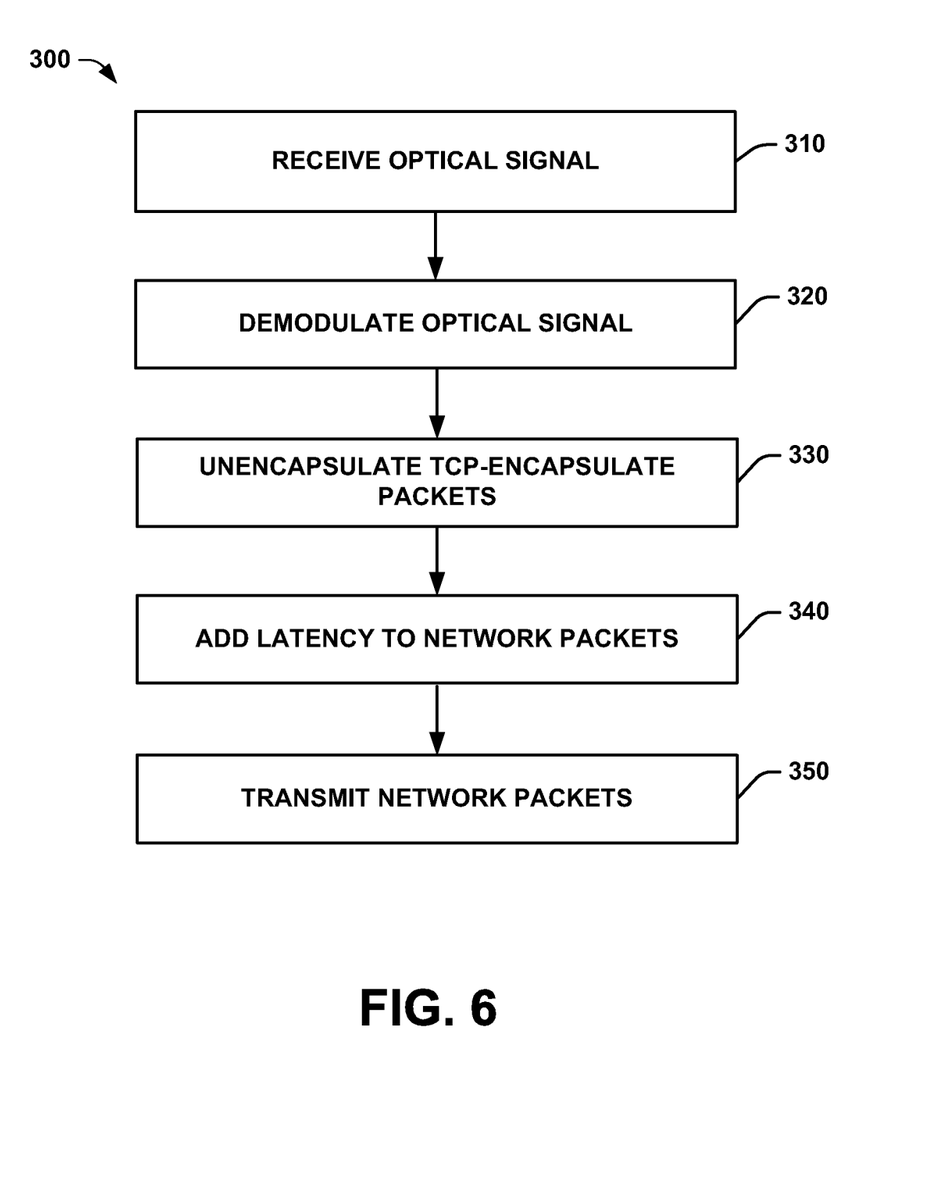
FIG. 6 illustrates another example of a flowchart of another example method for operating an FSO transceiver.

In view of the foregoing structural and functional features described above, example methods will be better appreciated with reference to FIGS. 5 and 6. While, for purposes of simplicity of explanation, the example methods of FIGS. 5 and 6 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 5 illustrates an example flowchart of a method 200 for implementing an FSO transceiver (e.g., the first or second FSO transceiver 4 or 6 illustrated in FIG. 1 and/or the FSO transceiver 150 illustrated in FIG. 4) in a fade tolerant network system that includes a FSO link, such as the system 2 illustrated in FIG. 1 and/or the system 100 illustrated in FIG. 3. At 210, network packets (e.g., Ethernet frames) can be received at a network port (e.g., the network port 152 of FIG. 4) of the FSO transceiver.

At 220, a transmission protocol controller (e.g., the transmission protocol controller 154 illustrated in FIG. 4) can encapsulate the network packets in TCP packets to form TCP-encapsulated packets. The transmission protocol controller can employ an alternate congestion algorithm (e.g., the TCP Westwood+ algorithm) to form the TCP-encapsulated packets.

At 230, the TCP-encapsulated packets can be provided to a modulator (e.g., the modulator 158 of FIG. 4) of a transmitter that can modulate the TCP-encapsulated packets onto a carrier signal to form modulated TCP-encapsulated packets. At 240, the TCP-encapsulated packets can be converted to an output optical signal and can be transmitted from a laser diode (e.g., the laser diode 160 of FIG. 4) of the transmitter over the FSO link to another FSO transceiver.

FIG. 6 illustrates another example flowchart of a method 300 for implementing an FSO transceiver (e.g., the first or second FSO transceiver 4 or 6 illustrated in FIG. 1 and/or the FSO transceiver 150 illustrated in FIG. 4) in a fade tolerant network system that includes a FSO link, such as the system 2 illustrated in FIG. 1 and/or the system 100 illustrated in FIG. 3. At 310, a photodetector (e.g., the photodetector of FIG. 4) of a receiver of the FSO can receive input optical signal. For purposes of simplification of explanation, it is presumed that the input optical signal received at the receiver corresponds to the output optical signal described in the method 200 of FIG. 5.

At 320, a demodulator (e.g., the demodulator 166 of FIG. 4) of the receiver can demodulate the input optical signal to generate (e.g. reconstruct) encapsulated TCP packets. At 330, a transmission protocol controller (e.g., the transmission protocol controller 154 of FIG. 4) can unencapsulate the TCP-encapsulated packets to generate (e.g., reconstruct) network packets (e.g., Ethernet frames). At 340 a buffer (e.g., the buffer 168 of FIG. 4) can add latency to each network packet to allow smoothing of throughput over time. At 350, the network packets can be transmitted to a LAN, such that the network packets can be delivered to an appropriate destination such as a node on the LAN.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A free-space optical (FSO) transceiver comprising:
    a transmission protocol controller configured to encapsulate outgoing Ethernet frames by employing the Transmission Control Protocol (TCP) to form outgoing TCP-encapsulated packets, wherein the protocol controller is configured to employ a congestion algorithm that optimizes throughput over a lossy link, wherein the outgoing Ethernet frames encapsulate TCP packets, such that each of the outgoing TCP-encapsulated packets generated by the transmission protocol controller encapsulates one of the outgoing Ethernet frames that encapsulates another TCP packet; and
    a transmitter configured to provide an output optical signal corresponding to the outgoing TCP-encapsulated packets over a FSO link.

2. The FSO transceiver of claim 1, wherein the congestion algorithm is the transmission control protocol (TCP) Westwood+ algorithm.

3. The FSO transceiver of claim 1, wherein the FSO link is subject to atmospheric scintillation.

4. The FSO transceiver of claim 1, further comprising:
a receiver configured to receive an input optical signal via the FSO link, wherein the input optical signal includes incoming TCP-encapsulated packets;
wherein the protocol controller is further configured to unencapsulate the incoming TCP-encapsulated packets to form incoming network packets.

5. The FSO transceiver of claim 4, further comprising:
a network port coupled to a local area network (LAN), the network port being configured to:
receive the outgoing Ethernet frames from the LAN; and
provide the incoming network packets to the LAN.

6. The FSO transceiver of claim 5, wherein the network port is an Ethernet port and the incoming network packets are incoming Ethernet frames.

7. The FSO transceiver of claim 5, wherein the incoming Ethernet frames encapsulate transmission control protocol (TCP) packets.

8. The FSO transceiver of claim 5, further comprising a buffer configured to add latency to each of the incoming network packets.

9. The FSO transceiver of claim 1, wherein the output optical signal is transmitted to another FSO transceiver via the FSO link.

10. A system comprising:
a first free space optical (FSO) transceiver configured to:
receive Ethernet frames from a first subnet of a local area network (LAN);
encapsulate the Ethernet frames in Transmission Control Protocol (TCP)-encapsulated packets by employing the TCP with a congestion algorithm that optimizes throughput over a lossy link, wherein the Ethernet frames encapsulate TCP packets, such that each of the TCP-encapsulated packets encapsulates one of the Ethernet frames that encapsulates another TCP packet; and
provide an output optical signal over free space, the output optical signal corresponding to the encapsulated packets; and a second FSO transceiver separated by free space from the FSO transceiver, the second FSO transceiver being configured to:
receive the output optical signal from the first FSO transceiver;
unencapsulate the TCP-encapsulated packets to reconstruct the Ethernet frames; and
provide the Ethernet frames to a second subnet of the LAN.

11. The system of claim 10, wherein the second FSO transceiver is configured to add a latency to each of the Ethernet frames provided to the second subnet of the LAN.

12. The system of claim 10, wherein the Ethernet frames are provided from a first node on the first subnet of the LAN to a second node on the second subnet of the LAN.

13. The system of claim 10, wherein the first FSO transceiver and the second FSO transceiver are separated by at least 1 kilometer.

14. A method comprising:
receiving, by a network port, Ethernet frames;
encapsulating, by a protocol controller, the network packets with the transmission control protocol (TCP) to form TCP-encapsulated packets, wherein the TCP-encapsulated packets are formed with a congestion algorithm that optimizes throughput over a lossy link, wherein the Ethernet frames encapsulate TCP packets, such that each of the TCP-encapsulated packets generated by the protocol controller encapsulates one of the Ethernet frames that encapsulates another TCP packet; and
transmitting, by a transmitter, an output optical signal over free space that is based on the TCP-encapsulated packets.

15. The method of claim 14, wherein the congestion algorithm is the TCP Westwood+ congestion algorithm.

16. The method of claim 15, wherein the output optical signal is received by a receiver separated from the transmitter by a distance of at least 500 meters.

17. The FSO transceiver of claim 1, wherein the TCP packets encapsulated by the outgoing Ethernet frames and the outgoing TCP-encapsulated packets implement different congestion algorithms.

\* \* \* \* \*